United States Patent [19]

Zaplatynsky

[11] Patent Number: 5,080,977
[45] Date of Patent: Jan. 14, 1992

[54] COMPOSITE THERMAL BARRIER COATING

[75] Inventor: Isidor Zaplatynsky, Fairview Park, Ohio

[73] Assignee: United States of America, as represented by the Administrator, Nat'l. Aero. and Space Admin., Washington, D.C.

[21] Appl. No.: 560,926

[22] Filed: Jul. 31, 1990

[51] Int. Cl.$^5$ .............................................. B32B 17/06
[52] U.S. Cl. ...................... 428/432; 428/212; 428/213; 428/426; 428/433; 428/469; 428/472.2; 428/697; 428/701; 428/702
[58] Field of Search .............. 428/426, 433, 432, 701, 428/702, 697, 213, 469, 472.2, 633, 212; 501/32

[56] References Cited

U.S. PATENT DOCUMENTS

| | | | |
|---|---|---|---|
| 4,152,166 | 5/1979 | Rogers | 106/43 |
| 4,321,310 | 3/1982 | Ulion et al. | 428/633 |
| 4,335,190 | 6/1982 | Bill et al. | 428/633 |
| 4,485,151 | 11/1984 | Stecura | 428/633 |
| 4,579,829 | 4/1986 | Garvie | 501/106 |
| 4,588,699 | 5/1986 | Brennan et al. | 501/9 |
| 4,640,899 | 2/1987 | Hillig et al. | 501/5 |
| 4,749,665 | 6/1988 | Yano et al. | 501/32 |
| 4,755,490 | 7/1988 | DiLazzaro | 501/32 |
| 4,774,150 | 9/1988 | Amano | 428/701 |
| 4,775,596 | 10/1988 | Holleran | 428/428 |
| 4,788,046 | 11/1988 | Barringer | 501/32 |
| 4,808,460 | 2/1989 | Chyung et al. | 428/116 |
| 4,880,614 | 11/1989 | Strangman et al. | 428/633 |
| 4,973,564 | 11/1990 | Chyung et al. | 428/312.6 |

Primary Examiner—James J. Seidleck
Assistant Examiner—Archene Turner
Attorney, Agent, or Firm—Gene E. Shook; John R. Manning; James A. Mackin

[57] ABSTRACT

A composite thermal barrier coating for a substrate has a first layer including a first ceramic material and a second layer including a second ceramic material impregnated with a glass, the glass being a ternary eutectic. The glass may consist of about 14.6 weight percent $Al_2O_3$, about 23.3 weight percent CaO, and about 62.1 weight percent $SiO_2$. The first and second ceramic materials may include yttria-stabilized zirconia.

7 Claims, 1 Drawing Sheet

COMPOSITE THERMAL BARRIER COATING

ORIGIN OF THE INVENTION

The invention described herein was made by an employee of the U.S. Government and may be manufactured and used by or for the Government for governmental purposes without the payment of any royalties thereon or therefore.

BACKGROUND OF THE INVENTION

1. Field of the Invention

The present invention relates generally to thermal barrier coatings, and more particularly to thermal barrier coatings of ceramics impregnated with a glass and methods of preparing same.

2. Description of the Related Art

Thermal barrier coatings are used in a wide variety of high temperature applications. For example, a thermal barrier coating of yttria-stabilized zirconia, such as $ZrO_2(8wt.\%)Y_2O_3$, may be used to protect critical components in thermal engines.

Typically, a bond coat is initially plasma sprayed upon the component to be protected (hereinafter referred to as the "substrate"). The bond coat may be, for example, a superalloy such as Ni-Cr-Al-Y or Co-Cr-Al-Y. Subsequently, the yttria-stabilized zirconia coating is plasma arc sprayed upon the bond coat.

Thermal barrier coatings, such as the above-mentioned yttria-stabilized zirconia coating, increase the capabilities of the substrate material because they are thermally insulating and strain-tolerant. Therefore, increased engine efficiency, durability and power may be achieved.

In practice, thermal barrier coatings have only met with limited success because they tend to degrade and fail at elevated temperatures. Analysis has shown that this degradation and failure is most often caused by oxidation of the bond coat and thermal fatigue of the yttria-stabilized zirconia coating. Plasma sprayed ceramic coatings contain cracks, which result from solidification of sprayed particles, and up to 10% porosity by volume. Though these defects are helpful in reducing the affects of thermal stresses, they also promote oxidation by facilitating penetration of oxygen and other corrosive compounds through the yttria-stabilized zirconia coating to the bond coat. Consequently, conventional thermal barrier coatings have met with only limited success.

SUMMARY OF THE INVENTION

It is an object of the present invention to provide improved thermal barrier coatings that exhibit high durability at elevated temperatures.

Another object of the present invention is to provide improved thermal barrier coatings that are strain-tolerant and which mitigate penetration of oxygen into the bond coating.

Still another object of the present invention is to provide improved thermal barrier coatings that are self-healing during thermal cycling.

Yet another object of the present invention is to provide methods for easily producing improved thermal barrier coatings that achieve the foregoing objects.

In order to achieve the foregoing and other objects, in accordance with the purposes of the present invention as described herein, a composite thermal barrier coating for a substrate includes a ceramic and a glass, the glass consisting essentially of $Al_2O_3$, CaO and $SiO_2$.

A composite thermal barrier coating according to the present invention comprises a first layer that includes a first ceramic material, and a second layer that includes a second ceramic material impregnated with a glass, the glass being a ternary eutectic.

A preferred method of preparing a thermal barrier coating according to the present invention comprises the steps of comminuting a glass consisting essentially of $Al_2O_3$ CaO and $SiO_2$ to a particle size of about 325 mesh, comminuting a ceramic to a particle size greater than about 325 mesh and less than about 200 mesh, mixing the comminuted glass and the comminuted ceramic, sintering the mixture for about 10 to about 15 hours at about 1400° C., comminuting the sintered mixture to a particle size greater than about 325 mesh and less than about 200 mesh, and plasma spraying the comminuted mixture onto a bond coat previously sprayed onto the substrate.

These and other features and advantages of the present invention will become more apparent with reference to the following detailed description and drawings.

BRIEF DESCRIPTION OF THE DRAWINGS

The accompanying drawing illustrates several aspects of the present invention, and together with the description serves to explain the principles of the present invention. In the drawing.

DETAILED DESCRIPTION OF THE PREFERRED EMBODIMENTS

Figure 1:
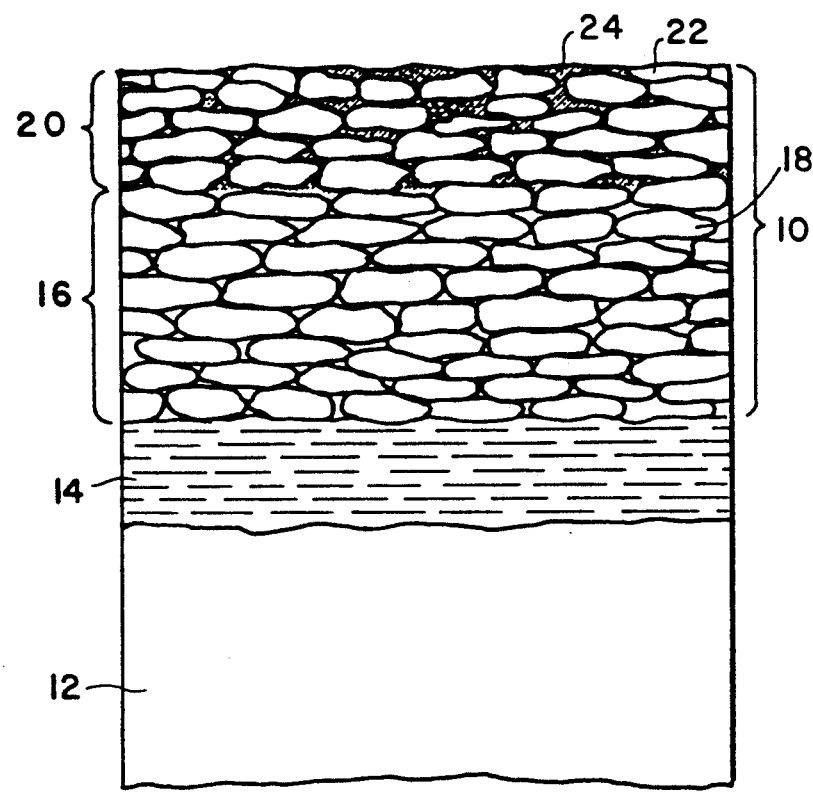
FIG. 1 is a cross-sectional view of a composite thermal barrier coating according to the present invention.

FIG. 1 is a cross-sectional view of a composite thermal barrier coating 10 according to the present invention. Composite thermal barrier coating 10 is formed upon a substrate 12, with an intermediate bond coat 14 therebetween. Bond coat 14 is utilized to provide a durable bond between substrate 12 and composite thermal barrier coating 10. Alternatively, bond coat 14 may be omitted, and composite thermal barrier coating 10 formed directly upon substrate 12. Bond coat 14 may be, for example, a superalloy powder such as Co-Cr-Al-Y or Ni-Cr-Al-Y, which has been plasma sprayed upon substrate 12.

Composite thermal barrier coating 10 includes a yttria-stabilized zirconia layer 16 such as $ZrO_2$-$(8wt\%)Y_2O_3$. Yttria-stabilized zirconia layer 16 is formed by plasma spraying and is made up of solidified droplets of completely melted and partially melted zirconia particles.

Composite thermal barrier layer 10 also includes a glass-zirconia layer 20 which includes zirconia 22 surrounded by glass 24. Glass-zirconia layer 20 is plasma sprayed onto yttria-stabilized zirconia layer 16.

Because zirconia grains 22 in glass-zirconia 20 are surrounded by the glass phase 24, oxygen and other corrosive compound penetration into bond coat 14 is reduced.

The glass coating from the glass droplets 24 is a ternary eutectic in an $Al_2O_3$-CaO-$SiO_2$ system. In a preferred embodiment of the invention, the glass material essentially comprises about 14.6 weight percent $Al_2O_3$, about 23.3 weight percent CaO, and about 62.1 weight percent $SiO_2$. This glass composition is preferred because it does not react with yttria-stabilized zirconia; its coefficient of thermal expansion is smaller than that of zirconia; it is viscous at use-temperature, e.g., in excess of 1200° C.; and remains in amorphous state at use-temperature. The last two of the above-mentioned properties are desired in order to promote self-healing of cracks that may form during thermal cycling.

Composite thermal barrier layer coating 10 may be formed by the following process. An $Al_2O_3$-CaO-$SiO_2$ system glass having about 14.6 weight percent $Al_2O_3$, about 23.3 weight percent CaO, and about 62.1 weight percent $SiO_2$ is formed by reacting $Al(OH)_3$, $CaCO_3$ and $SiO_2$ at about 1500° C. in a platinum crucible. This glass is comminuted to have a particle size of about 325 mesh (45 micrometers), for example, in a roll crusher. Zirconia is also comminuted to a particle size larger than about 325 mesh (45 micrometers) and smaller than about 200 mesh (75 micrometers). The comminuted glass and the comminuted zirconia are mixed, preferably in a ratio of about one unit (by volume, considering true densities) of the comminuted glass and about nine units (by volume, considering true densities) of the comminuted zirconia. This mixture is then sintered at about 1400° C. for about 10 to about 15 hours. The sintered mixture is subsequently comminuted to a particle size larger than about 325 mesh (45 micrometers) and smaller than about 200 mesh (75 micrometers). The resulting comminuted mixture is a glass-zirconia powder which is injected into a plasma gun to form glass-zirconia layer 20.

Another method of preparing glass-zirconia layer 20 involves a sol-gel technique. A sol is prepared by mixing tetraethoxysilane (TEOS) $Si(OC_2H_5)_4$, aqueous solutions of $Al(NO_3)_3$ and $Ca(NO_3)_2$ and ethyl alcohol. Then, the sol is acidified with HCl and zirconia powder is added therewith, and constantly stirred while heating in order to evaporate ethyl alcohol and some water. Thus obtained thick paste, composed of zirconia grains covered with gel (precursor of glass) is dried and heated to eliminate the remaining water and to decompose aluminum and calcium nitrates, resulting in the formation of corresponding oxides, ($SiO_2$, $Al_2O_3$, and CaO). This resulting agglomerate is heated to and held at 1300° C. for several hours to form a glass-zirconia material. The glass-zirconia material is comminuted, for example, in a roll crusher, to form a glass-zirconia powder having a particle size of about 325 mesh (45 micrometers) and smaller than about 200 mesh (75 micrometers). This glass-zirconia powder is then fed into a plasma spray gun to form the glass-zirconia layer 20.

Composite thermal barrier coating 10 reduces oxygen penetration therethrough without affecting compliance. Therefore, thermal fatigue is not sacrificed for the sake of preventing oxidation. Because the glass in glass-zirconia layer 20 is viscous and amorphous at use-temperature, cracks that may occur during thermal cycling are self-healing.

ALTERNATE EMBODIMENT OF THE INVENTION

Figure 2:
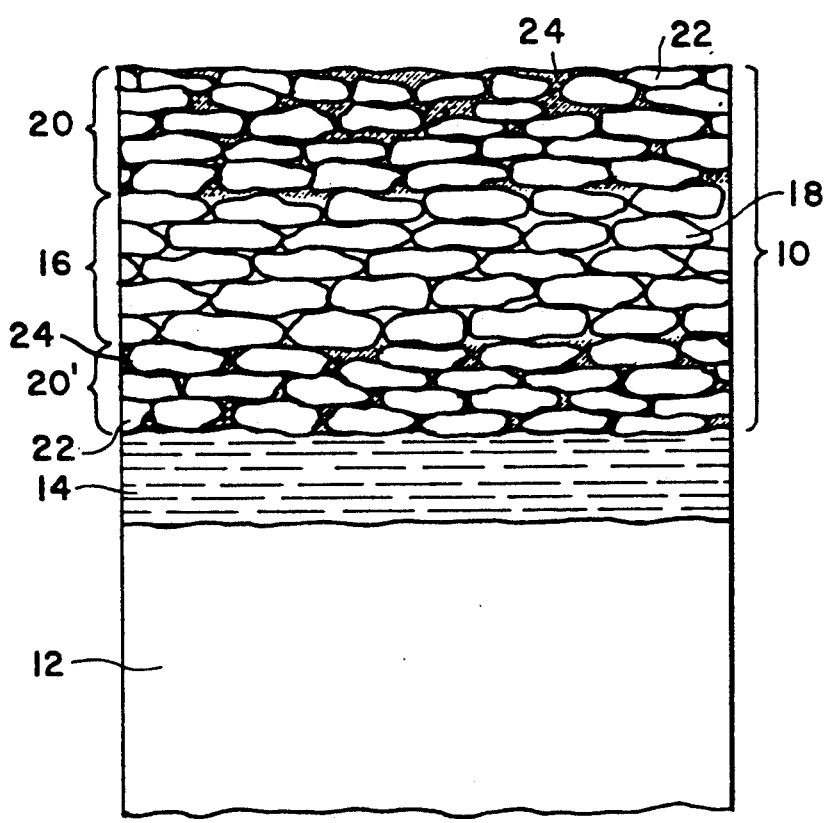
FIG. 2 is a cross-sectional view of an alternate embodiment of a composite thermal barrier coating of the invention.

Referring now to FIG. 2, there is shown an alternate embodiment of the invention in which the thickness and positioning of the layers of zirconia 16 and glass-zirconia 20 are changed. More particularly, in one such example, a glass-zirconia layer 20' is deposited between the zirconia layer 16 and the bond coat 14.

Numerous modifications and adaptations of the present invention will be apparent to those so skilled in the art. For example, the composition of the glass may be changed by the addition of $B_2O_3$ to improve the stability of the glass at lower temperatures. Thus, it is intended by the following claims to cover all modifications and adaptations which fall within the true spirit and scope of the invention.

What is claimed is:

1. A composite thermal barrier coating for use in a high temperature, oxidative, corrosive, gaseous environment comprising:

a first layer including a yttria stabilized zirconia cermaic material;

a second layer adhere to said first layer and between said first and said gaseous environment including said ceramic material impregnated with an alumina-calcia silica glass in an effective amount to mitigate the passing of said hot oxidative, corrosive gases through said second layer to said first layer, the glass being a ternary eutectic.

2. A composite thermal barrier coating as recited in claim 1, wherein:

said glass consists essentially of about 14.6 weight percent $Al_2O_3$, about 23.3 weight percent CaO and about 62.1 weight percent $SiO_2$.

3. A composite thermal barrier coating for use in a high temperature, oxidative, corrosive, gaseous environment comprising:

a first layer including a yttria stabilized zirconia ceramic material impregnated with an alumina-calcia silica glass ternary eutectic in an effective amount to mitigate the passing of said hot gases therethrough;

a second layer including said ceramic material; and a third layer substantially the same as said first layer.

4. A composite thermal barrier coating as recited in claim 3 wherein said layers have different thicknesses.

5. An article of manufacture for use in a high temperature, oxidative, corrosive, gaseous environment comprising:

a component having a surface facing said gaseous environment; and a thermal barrier coating covering said surface for protecting the same;

said thermal barrier coating comprising:

a layer of a yttria stabilized zirconia ceramic material and adhered thereto at least one layer of yttria stabilized zirconia ceramic material impregnated with a glass consisting essentially of about 14.6 weight percent $Al_2O_3$, about 23.3 weight percent CaO, and about 62.1 weight percent $SiO_2$ in an effective amount to mitigate the passing of said hot oxidative, corrosive gases through said zirconia to said surface.

6. An article of manufacture as recited in claim 5, including a bond coat between said surface and said thermal barrier coating whereby the glass in the ceramic coating prevents the gases from contacting the bond coat.

7. An article of manufacture as claimed in claim 5 wherein the glass comprises about 10 percent by volume of the thermal barrier coating.

* * * * *